C. E. & A. W. LINDGREN.
WRENCH.
APPLICATION FILED NOV. 14, 1910.
999,377.
Patented Aug. 1, 1911.
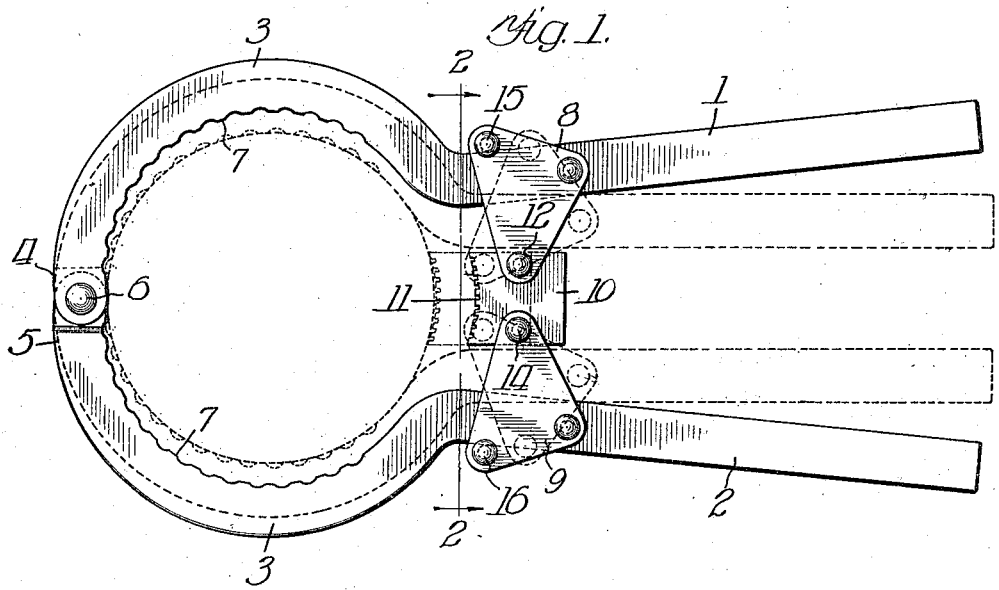
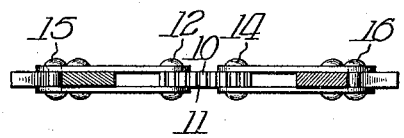
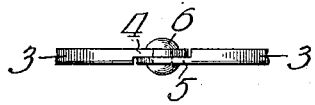
Witnesses:
Robert N. Weir
Blanche Chalmers.
Inventor:
Charles E. Lindgren
Arthur W. Lindgren
By Burton U. Hill Atty.
COLUMBIA PLANOGRAPH CO., WASHINGTON, D. C.

UNITED STATES PATENT OFFICE.

CHARLES E. LINDGREN AND ARTHUR W. LINDGREN, OF AURORA, ILLINOIS.

WRENCH.

999,377. Specification of Letters Patent. Patented Aug. 1, 1911.

Application filed November 14, 1910. Serial No. 592,238.

*To all whom it may concern:*

Be it known that we, CHARLES E. LINDGREN and ARTHUR W. LINDGREN, both citizens of the United States, residing at Aurora, in the county of Kane and State of Illinois, have invented a certain new, useful, and Improved Wrench, of which the following is a description.

Our invention relates to a gripping device or wrench for adjusting the relative positions for circular or cylindrical objects.

The object of our invention is to produce a device of the kind described, adapted to engage an object of circular section to firmly hold and rotate the same without the probability of crushing, marring or otherwise injuring it.

To this end our invention consists in the novel construction, arrangement and combination of parts herein shown and described, and more particularly pointed out in the claims.

In the accompanying drawings wherein like or similar reference characters indicate like or corresponding parts, Figure 1 is a plane view of our device. Fig. 2 is a section taken substantially on line 2—2 of Fig. 1. Fig. 3 is a fragmentary view showing the pivotal connection between the arms of our device.

In the preferred form shown in the drawings, our device consists of a pair of arms 1—2 each preferably curved at one end as at 3 to fit upon the periphery of a circular object. In the form shown the extremities 4 and 5 at the curved ends of the arms are each shouldered and reduced in thickness so as to form a lapped joint and a pin, rivet or other suitable means 6 is loosely positioned in a suitable opening in the reduced portion of the arms to form a pivotal connection between the arms. In the preferred construction also the inner portion of the part 3 of each arm is dentilated as at 7—7, so that a circular or cylindrical object may be positioned between the curved portions of the arms and firmly gripped and held against rotation by the projections 7 operating as teeth to engage the periphery of the object and prevent its rotation. When thus constructed our device will operate fairly satisfactorily upon iron pipe, gas fixtures or other objects, the walls of which are of sufficient strength to resist the crushing tendency of the engagement of the arms. Where however, it is desired to operate upon thin brass tubing, the threaded tops of tin or glass containers, or other objects having comparative thin and weak walls, if the free ends of the arms 1 and 2 are forced together with sufficient pressure to suitably engage the object, a portion of the object opposite the pivotal connection 6 is forced outward thereby tending to distort the object and cause it to bind or clamp upon the threads or other portions of the article to which it is attached and prevent its movement, thereby defeating the purpose for which the wrench is intended and a further effort to operate the wrench, tending to mar the surface or permanently distort the object or otherwise deface the same.

In our improved device a pair of triangular links 8 and 9 are pivotally attached at one corner of the arms 1 and 2 respectively. A jaw 10 preferably having a curved dentilated face 11 is adapted to coöperate with the parts 3—3 of the arms is positioned between the arms with rivets or pins 12—14 extending through a second corner of the triangular links 8 and 9 respectively and the sides of the jaw thereby pivotally connecting the jaw 10 with each of the arms and providing for a longitudinal movement of the jaw toward the pivotal connection 6 of the arms when the free ends of the arms are forced toward each other. In the preferred construction pins 15 and 16 are provided in the third corner of the triangular links 8 and 9 respectively each adapted to engage their respective arms 1 and 2 to limit the movement of the links 8 and 9 and jaw 10 when our device is opened and the free ends of the arms 1 and 2 are separated. The several parts are so constructed that the pins 12 and 14 cannot reach a position directly between the pivotal connection of the links 8 and 9 with the arms 1 and 2 so that there is no tendency to lock our device in its open position. When thus constructed it is obvious that with the parts properly proportioned the pressure upon the periphery of an object engaged by our device will be substantially equal with practically no tendency toward distortion, even where the walls are extremely thin and pliable. The least possible pressure therefore upon the walls of the object will produce the desired rotation with the slightest effort on the part of the operator.

Having thus described our improvement it is obvious that various immaterial modifications may be made in our device without departing from the spirit of our invention, hence we do not wish to be understood as limiting ourselves to the exact form or construction shown.

What we claim as new and desire to secure by Letters Patent is:

1. A device of the kind described, comprising a pair of pivotally connected arms adapted to engage a circular object between them, in combination with a movable jaw positioned between said arms opposite said pivotal connection and adapted to coöperate with the arms and engage the object engaged by said arms.

2. A device of the kind described, comprising a pair of pivotally connected arms each provided with a curved dentilated portion adjacent the pivotal connection adapted to engage a circular object between them, in combination with a movable jaw positioned between said arms and adapted to coöperate with the arms and engage the object engaged by said arms.

3. A device of the kind described, comprising a pair of pivotally connected arms adapted to jointly engage a circular object, in combination with a movable jaw positioned between said arms and pivotally and independently connected to each arm adapted to coöperate with said arms to engage the object engaged by said arms.

4. A device of the kind described, comprising a pair of pivotally connected arms adapted to jointly fit upon and engage a circular object, in combination with a movable jaw positioned between said arms, a pair of links pivotally connecting each arm to said jaw, said jaw being adapted to coöperate with said arms to engage the object engaged by said arms.

5. A device of the kind described, comprising a pair of pivotally connected arms adapted to jointly fit upon and engage a circular object, in combination with a movable jaw positioned between said arms adapted to coöperate therewith to engage the object engaged by said arms and a pair of links pivotally connecting each arm to said jaw, and means upon said links for limiting the opening movement of said jaw.

6. A device of the kind described, comprising a pair of pivotally connected arms each provided with a curved dentilated portion adjacent the pivotal connection adapted to engage a circular object positioned between said arms, in combination with a movable jaw positioned between the arms and pivotally and independently connected to each adapted to coöperate with said arms to engage the object engaged by said arms.

7. A device of the kind described, comprising a pair of pivotally connected arms each provided with a curved dentilated portion near the pivotal connection adapted to jointly fit upon and engage a circular object, in combination with a movable jaw positioned between said arms and adapted to coöperate with the arms to engage the object engaged by said arms, a pair of links pivotally connecting each arm to said jaw, and means upon said links for limiting the opening movement of said jaw.

8. A device of the kind described, comprising a pair of pivotally connected arms each provided with a curved dentilated portion adapted to fit upon and engage a circular object, in combination with a movable jaw positioned between said arms and adapted to coöperate therewith to engage the object engaged by said arms and a pair of links pivotally connecting each arm to said jaw.

9. A device of the kind described, comprising a pair of pivotally connected arms adapted to jointly fit upon and engage a circular object, in combination with a movable jaw positioned between said arms and adapted to coöperate therewith to engage the object engaged by said arms, two pairs of triangular links each pivotally connected at one corner to an arm, at a second corner to said movable jaw, and at a third corner provided with a stop adapted to limit the longitudinal movement of said jaw.

In testimony whereof, we have hereunto signed our names in the presence of two subscribing witnesses.

CHARLES E. LINDGREN.
ARTHUR W. LINDGREN.

Witnesses:
WALTER L. WENGER,
THADDEUS J. MERRILL.

---

Copies of this patent may be obtained for five cents each, by addressing the "Commissioner of Patents, Washington, D. C."